(12) United States Patent
Johnson

(10) Patent No.: US 7,726,935 B2
(45) Date of Patent: Jun. 1, 2010

(54) WIND TURBINE ROTOR PROJECTION

(75) Inventor: Bud T. J. Johnson, Calgary (CA)

(73) Assignee: Envision Corporation, City of Belmopan (BZ)

( * ) Notice: Subject to any disclaimer, the term of this patent is extended or adjusted under 35 U.S.C. 154(b) by 241 days.

(21) Appl. No.: 11/569,340

(22) PCT Filed: May 17, 2005

(86) PCT No.: PCT/CA2005/000766

§ 371 (c)(1),
(2), (4) Date: Nov. 17, 2006

(87) PCT Pub. No.: WO2005/111413

PCT Pub. Date: Nov. 24, 2005

(65) Prior Publication Data

US 2008/0166242 A1  Jul. 10, 2008

(30) Foreign Application Priority Data

May 19, 2004  (CA) .................................... 2467199

(51) Int. Cl.
*F03D 1/04* (2006.01)
(52) U.S. Cl. ........................ 415/4.3; 415/4.5
(58) Field of Classification Search ................ 415/4.1, 415/4.2, 4.3, 4.5, 133; 416/188, 142, 143
See application file for complete search history.

(56) References Cited

U.S. PATENT DOCUMENTS

| 1,669,055 | A | | 5/1928 | Hogg |
|---|---|---|---|---|
| 2,017,961 | A | * | 10/1935 | Ferral ........................... 415/4.5 |
| 2,068,792 | A | | 1/1937 | Dekker |
| 2,650,752 | A | | 9/1953 | Hoadley |
| 2,664,961 | A | | 1/1954 | Goede |
| 2,973,041 | A | | 2/1961 | Rabinow |
| 3,209,156 | A | | 9/1965 | Struble |
| 3,228,475 | A | | 1/1966 | Worthmann |
| 3,339,078 | A | | 8/1967 | Crompton |
| 3,339,961 | A | | 9/1967 | Schaefer |
| 4,021,135 | A | | 5/1977 | Pedersen et al. |
| 4,070,131 | A | | 1/1978 | Yen |

(Continued)

FOREIGN PATENT DOCUMENTS

BE    567272 A    5/1958

(Continued)

OTHER PUBLICATIONS

English abstract of DE 4125691 Published on Feb. 4, 1993.

(Continued)

*Primary Examiner*—Edward Look
*Assistant Examiner*—Dwayne J White
(74) *Attorney, Agent, or Firm*—Osler, Hoskin & Harcourt LLP

(57) ABSTRACT

An horizontal axis wind turbine having a rotor (3) with a frontal projection comprising a stationary spherical head (1) upstream of its multibladed turbine rotor (3) displaces and increases the speed of wind addressed over 70% of the total frontal area. A series of thin airfoils (12) radially and evenly placed on said spherical head (1) to direct wind towards the turbine short blades (4).

20 Claims, 4 Drawing Sheets

U.S. PATENT DOCUMENTS

| | | | |
|---|---|---|---|
| 4,127,356 A | 11/1978 | Murphy | |
| 4,140,433 A | 2/1979 | Eckel | |
| 4,288,704 A | 9/1981 | Bosard | |
| 4,309,146 A | 1/1982 | Hein et al. | |
| 4,320,304 A | 3/1982 | Karlsson et al. | |
| 4,335,319 A | 6/1982 | Mettersheimer, Jr. | |
| 4,350,900 A | 9/1982 | Baughman | |
| 4,411,588 A | 10/1983 | Currah, Jr. | |
| 4,424,452 A | 1/1984 | Francis | |
| 4,868,408 A | 9/1989 | Hesh | |
| 5,038,049 A | 8/1991 | Kato | |
| 5,137,417 A * | 8/1992 | Lund | 415/4.1 |
| 5,375,968 A | 12/1994 | Kollitz et al. | |
| 5,391,926 A | 2/1995 | Staley et al. | |
| 5,457,346 A | 10/1995 | Blumberg et al. | |
| 5,852,331 A | 12/1998 | Giorgini | |
| 6,132,172 A | 10/2000 | Li | |
| 6,158,953 A | 12/2000 | Lamont | |
| 6,191,496 B1 | 2/2001 | Elder | |
| 6,382,904 B1 | 5/2002 | Orlov et al. | |
| 6,538,340 B2 | 3/2003 | Elder | |
| 6,655,907 B2 | 12/2003 | Brock et al. | |
| 6,740,989 B2 | 5/2004 | Rowe | |
| 6,849,964 B2 | 2/2005 | Becherucci et al. | |
| 7,214,029 B2 | 5/2007 | Richter | |
| 2004/0042894 A1 | 3/2004 | Smith | |
| 2006/0291993 A1 | 12/2006 | Johnson | |

FOREIGN PATENT DOCUMENTS

| | | |
|---|---|---|
| DE | 4125691 A | 2/1993 |
| DE | 19526718 | 1/1997 |
| FR | 547884 | 12/1922 |
| FR | 2422047 A2 | 11/1979 |
| GB | 545587 A | 6/1942 |
| JP | 360029 | 10/1947 |
| JP | 52009742 | 1/1977 |
| JP | 52043047 | 4/1977 |
| JP | 10089234 | 4/1998 |
| JP | 11173253 | 6/1999 |
| JP | 2001082314 | 3/2001 |
| NZ | 507483 | 3/2002 |
| RU | 2039308 | 7/1995 |
| RU | 2106524 | 3/1998 |
| RU | 2147693 | 4/2000 |
| RU | 2166665 | 5/2001 |
| RU | 2191288 C1 | 10/2002 |
| RU | 12195 U1 | 3/2008 |
| SU | 10199 A1 | 6/1929 |
| SU | 74518 A | 7/1949 |

OTHER PUBLICATIONS

Image Downloaded from http//en.wikipedia.org/wiki/image:Compr. Assiale.jpg; Flanker; Oct. 11, 2006.
Concise Explanation of the Relevance of Russian Patent No. RU12195 Published on Dec. 16, 1999, Done by Andrei Moskvitch; Montreal, Apr. 20, 2009.
English Abstract of French Patent No. FR2422047, Published on May 2, 1977.
Abstract of Application NZ507483 published on Mar. 28, 2002.
Concise Explanation of the Relevance of French Patent No. FR547884, Published on Oct. 5, 1922, Done by Andrei Moskvitch; Montreal, Apr. 20, 2009.
International Search Report of application PCT/CA2005/000766; Aug. 24, 2005; Gilbert Plouffe.
English Abstract of Russian Patent RU2147693, Published on Apr. 20, 2000.
English Abstract of Russian Patent RU2191288, Published on Oct. 20, 2002.
English Abstract of Russian Patent RU2166665, Published on May 10, 2001.
Concise Explanation of the Relevance of Belgium Patent No. BE567272 Published on May 14, 1958, Done by Andrei Moskvitch; Montreal, Apr. 20, 2009.
Concise Explanation of the Relevance of Soviet Union Inventor's Certificate No. SU74518 Published on Jul. 31, 1949, Done by Andrei Moskvitch; Montreal Apr. 20, 2009.
Concise Explanation of the Relevance of Russian Patent No. RU2039308 Published on Jul. 9, 1995, Done by Andrei Moskvitch; Montreal Apr. 20, 2009.
Concise Explanation of the Relevance of Russian Patent No. RU2106524 Published on Mar. 10, 2009, Done by Andrei Moskvitch; Montreal, Apr. 20, 2009.
Concise Explanation of the Relevance of Soviet Union Inventor's Certificate No. SU10199 Published on Apr. 29, 1929, Done by Andrei Moskvitch; Montreal, Apr. 20, 2009.
English abstract of JP 10-089234.
English abstract of JP 2001-082314.
English abstract of JP 11-173253.
English abstract of JP 52-043047.
English abstract of DE 19526718.

\* cited by examiner

WIND TURBINE ROTOR PROJECTION

CROSS-REFERENCE TO RELATED APPLICATIONS

The present application claims priority to Canadian Patent Application No. 2,467,199 filed on May 19, 2004. The present application is the national stage entry of International Application No. PCT/CA2005/000766 filed on May 17, 2005.

FIELD OF THE INVENTION

The present invention relates to the field of turbines.

BACKGROUND OF THE INVENTION

The inventor has studied examples of present state of the art wind turbines of the propeller type, in particular, as they are now in common use.

At their apparently low levels of efficiency, another approach had to be made, to better utilize presently well known and commonly applied principles of fluid mechanics and aerodynamics, to improve our ability to extract maximum energy potential from the wind.

Based on principles of physics and aerodynamics known to the inventor, some serious possibilities were apparent, with numerous novel ways and means of embodying what he has seen as the best combinations of those principles to apply toward greater efficiency in the capture of wind energy. At the present time, there is a fast growing demand for electrical energy in particular, to be produced by means which do not damage the environment. This situation now provides adequate incentive toward the invention and development of wind power based generation of electrical energy, where individual unit capacity might range from a low of 20 kilowatts to as much as 5 megawatts per single unit.

OBJECTS OF THE INVENTION

It is an object of the present invention to ameliorate at least some of the inconveniences present in the prior art.

First is the matter of concentrating wind pressure over the entire addressable frontal exposure of turbine blades, and directing all of the available wind energy toward driving the turbine blades.

Second is to have main driven surfaces of the turbine blades situated within an outer thirty percent of a radius between an axle center and outer tips of the turbine blades. This feature greatly increases torque, and ultimate recovery of energy.

Thirdly, since usual present state of the art wind turbines are quite limited as to being able to provide useable power output at wind speeds below 15 kilometers (9.32 miles) per hour, it is of great advantage to be able to significantly increase oncoming wind speed, to lower the bottom threshold of the operating wind speed range of the wind turbine. The effect of a wind speed increase is cubic in nature, greatly increasing available kinetic energy (wattage per square meter).

Fourthly, it would be desirable to create or generate a continuously increasing vacuum or a lower pressure induction area behind the turbine blades.

Fifthly, there would be serious advantage in being able to create an effect of a coarser pitch of and to the turbine blades without having to apply any mechanical devices to the rotor or drive axle of the wind turbine.

In one aspect, the invention provides fluid turbine which has a rotor and a blade assembly. The rotor and blade assembly includes a rotor, the rotor being rotatable about an axis, the rotor having an outer surface, a plurality of blades extending from the outer surface of the rotor. Each of the blades has a tip and a main driven surface with an addressable frontal exposure. The blades are shaped and positioned such that there is no effective open area between the addressable frontal exposure of adjacent blades. Each of the blades is situated solely within an outer thirty percent of a radius defined between the axis and the tips of the blades. The turbine also has a stationary front portion forward of the rotor for displacing and increasing a speed of oncoming fluid. The stationary front portion is shaped and arranged with respect to the blades so as to direct the displaced fluid to the addressable frontal exposure area of the blades. The stationary front portion is at least partly spherical.

In a further aspect, the stationary front portion and the outer surface of the rotor together form a half sphere.

In an additional aspect, the stationary front portion is of half sphere shape and the outer surface of the rotor is cylindrical.

In a further aspect, the turbine has a plurality of radially spaced airfoils extending from the stationary front portion for directing oncoming fluid in a spiral fashion towards the blades, the airfoils being retractable into the stationary portion.

In another aspect, the turbine has a rotatable base for rotatably mounting the turbine.

In an additional aspect, the turbine has a conically shaped rear body for creating a low pressure induction area behind the blades.

In a further aspect, the fluid turbine is one of an air turbine or a water turbine.

In another aspect, the stationary portion is shaped to reduce surface tension of an oncoming fluid.

Additional and/or alternative features, aspects, and advantages of embodiments of the present invention will become apparent from the following description, the accompanying drawings, and the appended claims.

BRIEF DESCRIPTION OF THE INVENTION AND IMPROVEMENTS OVER PRESENT STATE OF THE ART

Based on the objects of this invention, the first improvement over present state of the art is the matter of concentrating wind energy driving force within outer 30 percent of a radius between an axle center and outer tips of turbine rotor blades. A half sphere shape including an outer surface of a turbine rotor, extends forward from a rear of the turbine rotor, in line with the axle center, and displaces more than seventy percent of a frontal area of a wind turbine.

A second improvement is achieved by deployment of the half sphere shape, including the outer surface of the turbine rotor, centered in line with the axle center, beginning at a rear face of the turbine rotor, and extending forward of the turbine rotor from the axle center, to front dead center of the half sphere shape. A portion of the half sphere shape extending forward from the turbine rotor, is mounted in a fixed stationary position, and does not rotate. The remainder, continuing rearward, as it represents the outer surface of the turbine rotor, rotates as part of the turbine rotor. This increases incoming wind speed as the wind spreads over the half sphere shape, and that is a common principle of physics. The wind speed increase lowers an operating wind speed threshold quite significantly, as a clear advantage over present state of the art.

The wind speed increase at a surface of the half sphere shape is ¼ C.times.R, and that ratio is 1.5707 to 1. That figure is reduced due to surface tension, drag, or friction against flow. A well known system referred to as Reynolds numbers could be used to determine an approximate drag factor. The inventor's engineering consultants suggest that a net velocity increase is 46%, and a resulting increase in available kinetic energy amounts to 1.46 cubed, or 311%.

A third improvement over present state of the art, is a matter of using as many as twenty four comparatively short and properly curved turbine blades of adequate front to back depth, and pitch angle, to achieve maximum torque drive, and further assure that no wind is going to get past the turbine blades, and must drive them all. Blade length must be adequate to catch or encounter all of wind mass that has been sped up. This consideration should be rather exact, as a blade length reaching beyond the faster moving wind mass, is going to be entering a slower moving wind mass, which will create drag, resulting in some efficiency loss. This situation provides maximum capture of wind energy, which is converted to the highest amount of torque at a driven axle. It will also be of some further advantage to indent the surface of the stationary front portion, in front of the turbine rotor, much the same as a golf ball. This could significantly reduce surface tension, resulting in a smoother and faster expanding arc of accelerated wind mass to drive the turbine blades.

A fourth improvement over present state of the art is where the as many as twenty four turbine blades are generating a significant vacuum induction effect behind the turbine blades. Three bladed propeller types of wind turbines of present state of the art are only doing so by means of three blades. In the case of this invention, we are gaining the effect of twenty four blades rather than three blades, and further enhancing the advantage, by assuring there is no effective open area between the blades where that vacuum induction effect can be broken, diminished or lost.

A fifth, or further potential improvement over present state of the art is a placement of a series of radially and evenly spaced thin airfoils on a periphery of the stationary front portion of the half sphere shape, beyond the turbine rotor. The airfoils would curve the incoming wind in a spiral fashion around the half sphere stationary front portion, in the same direction that the turbine rotor is turning. An advantage to be gained, is that a more open turbine blade pitch can be used with much the same effect as a more closed off blade pitch. This can eliminate a necessity for mechanical means of changing blade pitch when higher speed winds are encountered. For example, if the blade pitch is an average of forty degrees, we can curve the wind coming over the stationary front portion of the half sphere shape by twenty degrees in the direction of rotation, and the turbine blades will operate as though they had a coarser pitch. In a case of rather high wind speeds, the airfoils can be retracted inward, to zero effect, and the wind turbine rotor blades will then operate at their forty degree pitch. The airfoils can also be made of flexible material which can be progressively curved or bent like a spring. In that case the airfoils would not be retractable, and would remain in place at zero curvature, longitudinally, which would be much the same as being retracted to a point of no effect. The airfoils are an improvement over present state of the art, where mechanical means are used to vary blade pitch to access incoming wind more efficiently and safely, and to go to neutral, in the case of excessive wind speeds. With state of the art wind turbines, failure of mechanical pitch control, or failure of a governor system could lead to serious damage to the wind turbine.

In addition to the foregoing improvements over present state of the art, other options are intended, such as utilizing a smaller number of deeper turbine blades, or using a stationary complete half sphere in front of a turbine rotor. The turbine rotor would then have a flat faced purely cylindrical outer surface. It is also likely that we will be able to utilize a form of constant speed or step down transmission, as well as adding more load in a form of further generator capacity, and perhaps magnetic friction heating, to slow down and stabilize the turbine rotor when higher wind speeds are encountered. Since such options could be quite obvious to someone skilled in the art, they are not further included in either the detailed description or drawings to follow.

It is also apparent to the inventor, that a version of this invention could easily be applied as a wind power drive system for water craft, including ships on the ocean. Its basic features could also be applied as an under water front drive system for water craft. Highly efficient air circulation fans and aircraft propellers are further possibilities.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE INVENTION

Figure 1:
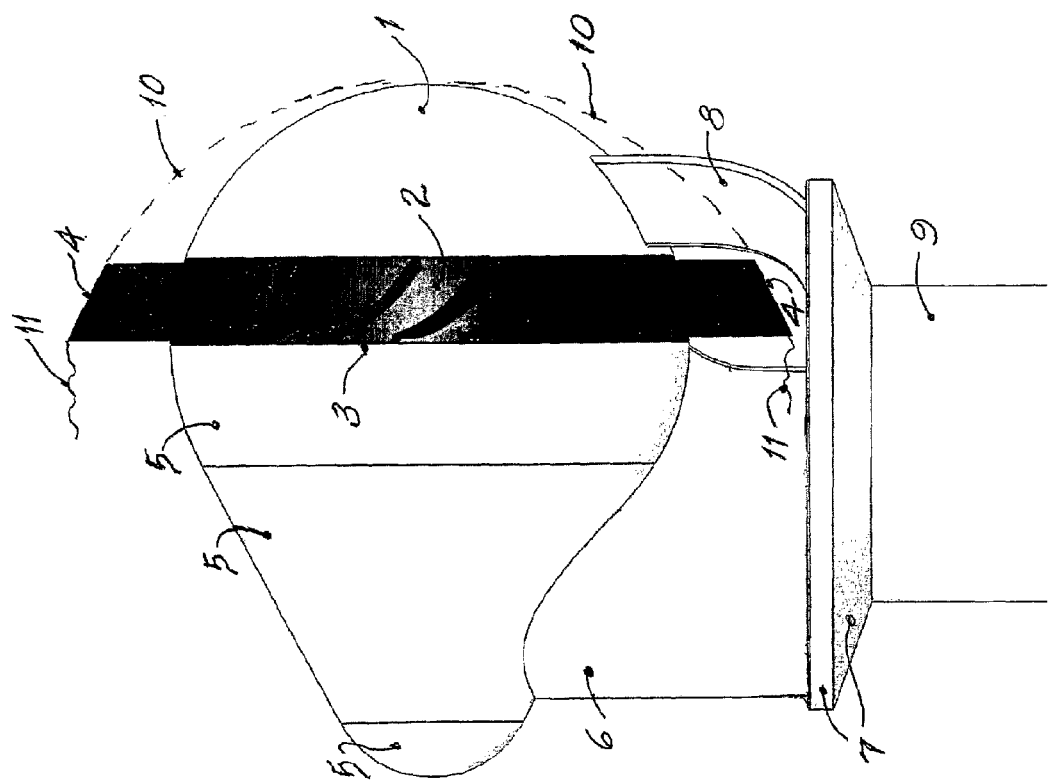
FIG. 1 is a right side elevation view of a first embodiment of a fluid turbine in accordance with the present invention.
Figure 2:
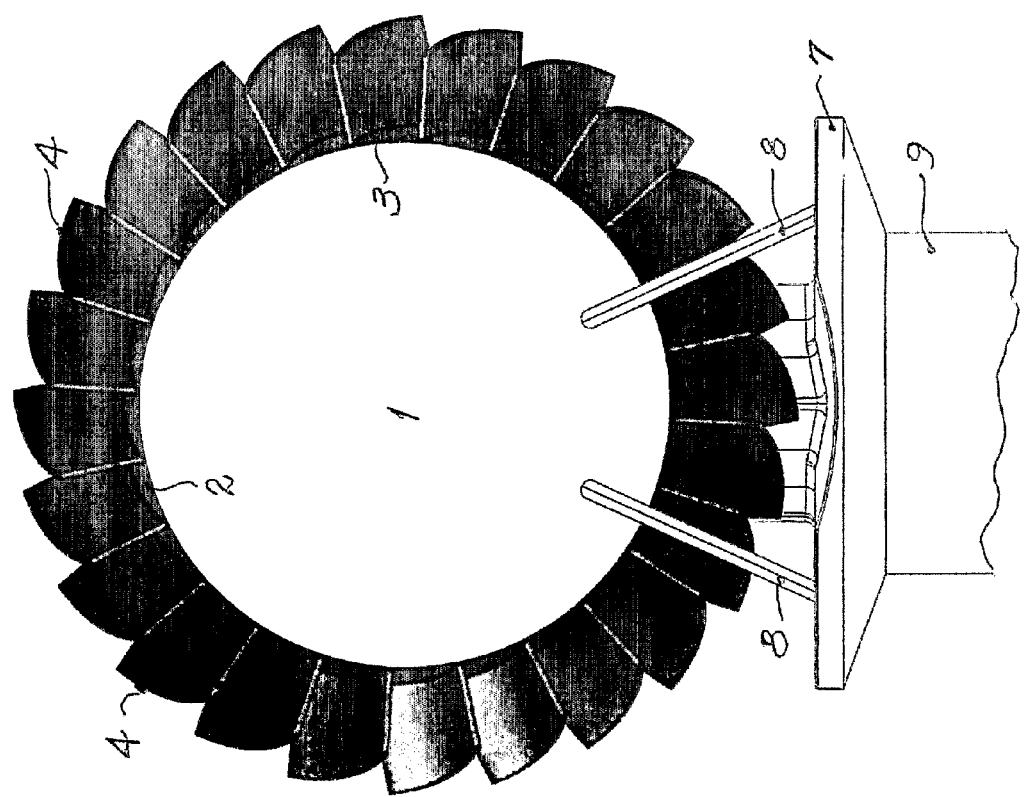
FIG. 2 is a front elevation view of the fluid turbine of FIG. 1.

With all of the foregoing in view, and such other and further purposes, advantages or novel features as may become apparent from consideration of this disclosure and specifications, the present invention consists of the inventive concept which is comprised, embodied embraced or included in various specific embodiments of such concept, reference being made to the accompanying figures, in which:

FIG. 1 shows a preferred embodiment of the invention, as mounted on a rotatable base 7 of a support tower column 9, with a turbine rotor 3 and twenty four rotor blades 4. The turbine rotor 3 has an outer surface 2, being a rearward portion of what would be a completed half sphere shape, including a stationary front portion 1, separately supported, and mounted closely in front of the turbine rotor 3. A close FIG. 2 shows the same preferred embodiment of the invention, as mounted on the rotatable base 7 of the support tower column 9, with the turbine rotor 3 and the twenty four turbine rotor blades 4.

Figure 3:
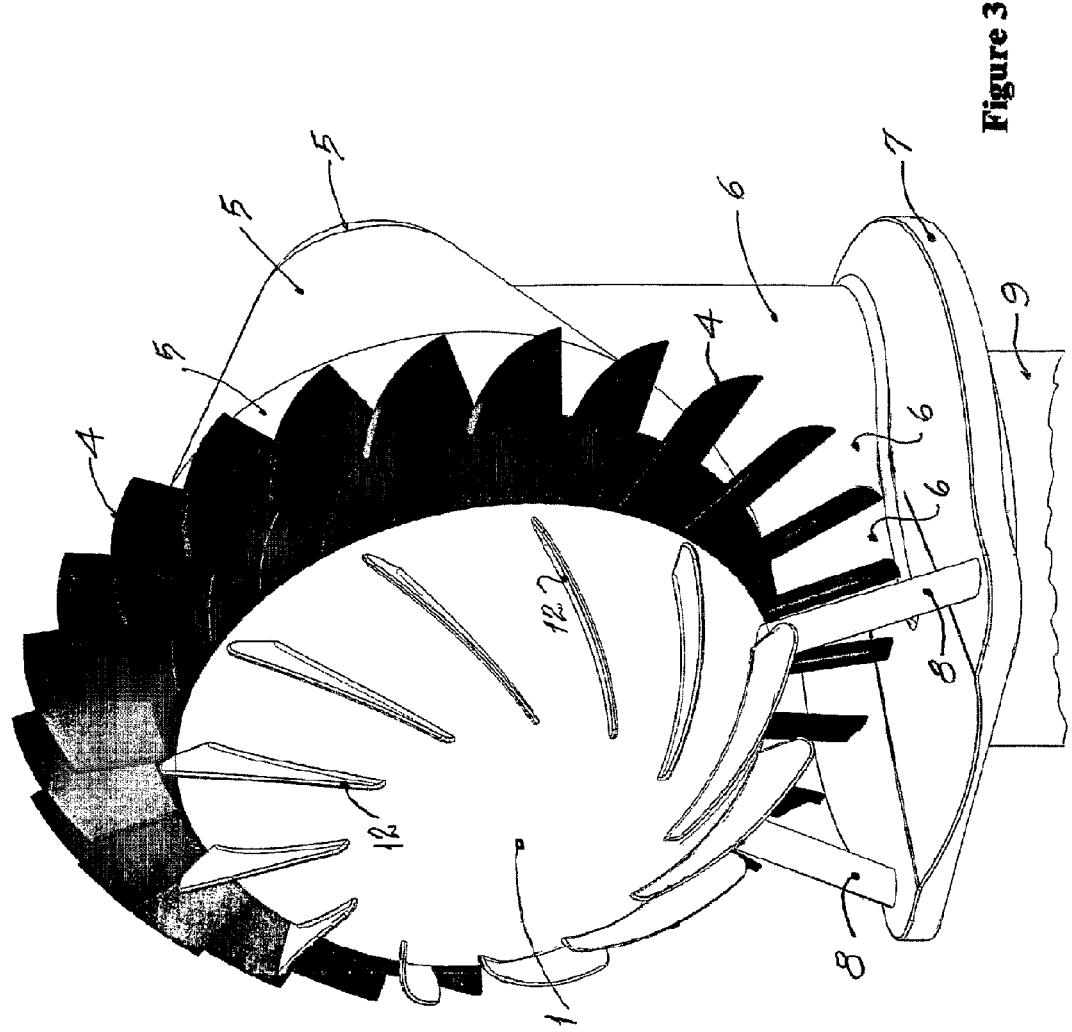
FIG. 3 is a front left side isometric view of an alternative embodiment of the fluid turbine of FIG. 1.
Figure 4:
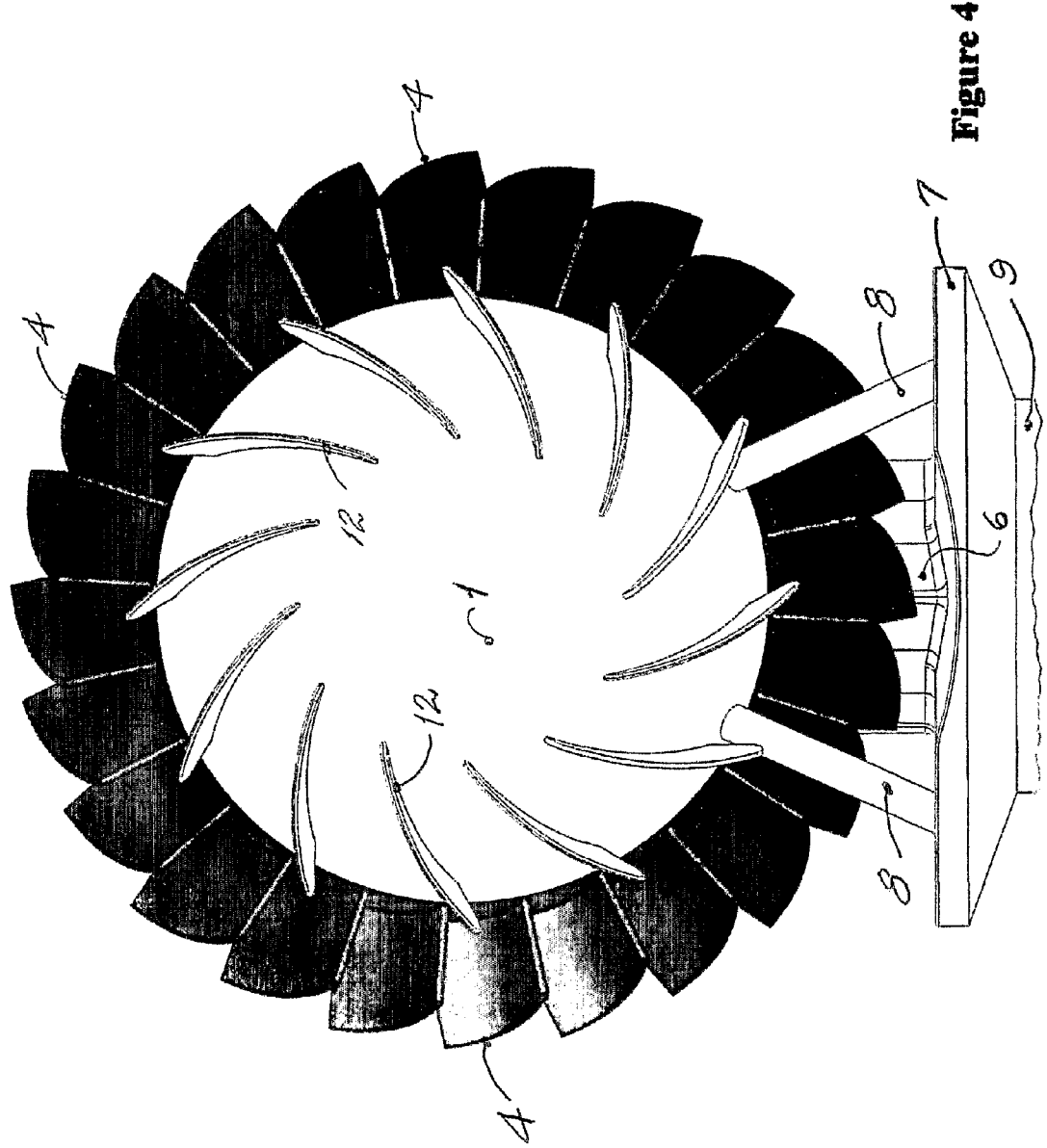
FIG. 4 is a front elevation view of the fluid turbine of FIG. 3.

FIGS. 3 and 4 show an alternative embodiment of the wind turbine. For clarity, structural elements, of a wind turbine shown in FIGS. 3 and 4, which are the equivalent and which function similarly to structural elements of the wind turbine shown in FIGS. 1 and 2, have the same reference numbers as the structural elements shown in FIGS. 1 and 2 and will not be described in detail.

FIG. 3 shows an alternative embodiment of the wind turbine, showing relative positions of twelve curved airfoils disposed on a stationary front portion of a half sphere shape, which can be recessed to full closure, and zero effect. The airfoils 12 would serve a purpose of curving an oncoming direction of the wind, in a rotational direction of turbine rotor blades 3, to add an effect of 20 or more degrees to the fixed turbine rotor blades 3 for a purpose of eliminating any necessity for pitch control.

FIG. 4 shows the wind turbine showing relative positions of the same twelve curved airfoils 12 as illustrated in FIG. 3.

FIG. 1 shows the preferred embodiment of the invention, as mounted on the rotatable base 7 of the support tower column 9, where the stationary front portion 1 of the half sphere shape, and the rotating portion 2 of the half sphere shape, which is also the outer surface 2 of the rotor 3. Then the turbine blades 4, and a conical shape of a rear outer encasement 5, and an aerodynamically shaped lower extension 6, of an outer body and wall, surrounding a supporting structure (not shown) and internalized access entry port (not shown), extending downward to the rotatable base 7, on top of the tower column 9.

Then FIG. 1 shows airfoil shaped structural support beams 8, for the stationary front portion 1 of the half sphere shape and a front end axle bearing (not shown), then a stationary portion of a structural support tower column 9, and a broken line 10 representing an outer periphery of a volume expansion area of wind displaced by the half spherical shape, and undulating lines 11, to indicate turbulence expected behind the turbine rotor 3, which would be common to exhausted wind behind the blades 4 of the wind turbine.

FIG. 2 shows the wind turbine, showing the stationary front portion 1 of the half sphere shape, the rotating curved outer circumferential surface 2, of the turbine rotor 3, being the remainder of the half sphere shape. Then there are shown turbine blades 4, of which there are twenty four in this embodiment. Also shown are support beams 8, for the stationary front portion 1 of the half sphere shape and the front axle bearing (not shown), and rotatable base 7, for the wind turbine, and then the stationary support tower column 9, which would extend to ground level.

FIG. 3 shows the alternative preferred embodiment of the wind turbine, showing relative positions of the twelve comparatively thin and retractable airfoils 12, placed upon and within the stationary front portion 1, of the half spherical shape of more than seventy percent of the radius from an axle center to inside edges or bottom ends of the comparatively short turbine blades 4. Then there is shown a conical projection of a rear body or encasement 5, segmented, as may be necessary for purposes of efficient manufacturing of such a projection, and then a somewhat cylindrical and aerodynamically shaped lower extension 6, of an outer body and wall surrounding supporting structural elements (not shown) and internal entry port (not shown), and extending downward to a rotatable base 7, on top of a supporting tower column 9.

FIG. 4 shown the same preferred embodiment as described in FIG. 3, where we can observe the curved retractable airfoils 12, and their relationship to the turbine blades 4, and we can further see the essential struts 8, supporting the front axle bearing of the turbine, and carrying the stationary frontal portion of half spherical shape 1, at the front of the wind turbine. Then we can see further an aerodynamically shaped front end of the lower extension 6 of the rear outer body and wall of the wind turbine, and then we can see the rotatable base 7, and the stationary support tower column 9.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A fluid turbine, comprising:
 a rotor and blade assembly, including:
  a rotor, the rotor being rotatable about an axis, the rotor having an outer surface, and
  a plurality of blades extending from the outer surface of the rotor, each of the blades having a tip and a main driven surface with an addressable frontal exposure, the blades being shaped and positioned such that there is no effective open area between the addressable frontal exposure of adjacent blades, the addressable frontal exposure of each of the blades being situated solely within at most an outer thirty percent of a radius defined between the axis and the tips of the blades, and
 a stationary front portion forward of the rotor for displacing and increasing a speed of oncoming fluid, the stationary front portion being shaped and arranged with respect to the blades so as to direct the displaced fluid to the addressable frontal exposure area of the blades, the stationary front portion being at least partly spherical, the stationary front portion blocking off at least seventy percent of the radius defined between the axis and the tips of the blades.

2. The fluid turbine in claim 1, further comprising a rotatable base for rotatably mounting the turbine.

3. The fluid turbine in claim 1, further comprising a conically shaped rear body for creating a low pressure induction area behind the blades.

4. The fluid turbine in claim 1, wherein the stationary portion is shaped to reduce surface tension of an oncoming fluid.

5. The fluid turbine in claim 1, wherein the stationary front portion and the outer surface of the rotor together form a half sphere.

6. The fluid turbine in claim 5, further comprising a plurality of radially spaced airfoils extending from the stationary front portion for directing oncoming fluid in a spiral fashion towards the blades.

7. The fluid turbine in claim 5, further comprising a rotatable base for rotatably mounting the turbine.

8. The fluid turbine in claim 5, further comprising a conically shaped rear body for creating a low pressure induction area behind the blades.

9. The fluid turbine in claim 5, wherein the fluid turbine is one of a wind turbine or a water turbine.

10. The fluid turbine in claim 1, wherein the stationary front portion is of a half sphere shape and the outer surface of the rotor is cylindrical.

11. The fluid turbine in claim 10, further comprising a plurality of radially spaced airfoils extending from the stationary front portion for directing oncoming fluid in a spiral fashion towards the blades.

12. The fluid turbine in claim 10, further comprising a rotatable base for rotatably mounting the turbine.

13. The fluid turbine in claim 10, further comprising a conically shaped rear body for creating a low pressure induction area behind the blades.

14. The fluid turbine in claim 10, wherein the fluid turbine is one of a wind turbine or a water turbine.

15. The fluid turbine in claim 1, further comprising a plurality of radially spaced airfoils extending from the stationary front portion for directing oncoming fluid in a spiral fashion towards the blades.

16. The fluid turbine in claim 15, further comprising a rotatable base for rotatably mounting the turbine.

17. The fluid turbine in claim 15, further comprising a conically shaped rear encasement for creating a low pressure induction area behind the blades.

18. The fluid turbine in claim 15, wherein the fluid turbine is one of a wind turbine or a water turbine.

19. The fluid turbine in claim 1, wherein the fluid turbine is one of a wind turbine or a water turbine.

20. The fluid turbine in claim 19, wherein the stationary portion is shaped to reduce surface tension of an oncoming fluid.

* * * * *